3,265,634
PROCESS FOR REGENERATING CATALYSTS
Robert G. Schultz, Vinita Park, and James M. Schuck, Webster Groves, Mo., assignors to Monsanto Company, a corporation of Delaware
No Drawing. Filed Nov. 1, 1963, Ser. No. 320,930
9 Claims. (Cl. 252—414)

This invention relates to catalysts for polymerizing olefins to liquid products. More particularly this invention relates to the art of regenerating spent catalysts which have been used for polymerizing olefins to liquid products.

With the arising need to find desirable catalyst compositions which are useful for dimerizing and polymerizing lower olefins to liquid olefin products having large fractions which are suiable as the alkylating agent in the process for making biodegradable alkylaryl sulfonates, various new catalyst compositions have been proposed for use in such olefin dimerization and polymerization processes. Some of these catalyst compositions are more important than others not only because they catalyze the dimerization and polymerization of lower olefins to liquid olefin products which are of the desirable type for detergent preparation, but also because of the longer catalyst life exhibited by such catalyst compositions. The longer catalyst life of the catalyst composition bears directly on the productivity of the catalyst, i.e., the longer the catalyst life the greater should be the unit weight of liquid product per unit weight of catalyst ratio.

One of the better catalyst composition classes found for lower olefin dimerizations to date has been those catalyst compositions containing cobalt oxide impregnated on a carbon support. By various procedural techniques the cobalt oxide on carbon compositions have been modified and varied so as to give substantially improved conversion and productivity figures. These matters are the subject of other applications.

One of the problems arising as a result of the use of cobalt oxide on carbon compositions as catalysts for dimerizing lower olefins to liquid olefin products has been that once the fresh activated cobalt oxide on carbon catayslt composition has been used in the polymerization and has lost its catalytic activity after extensive time use periods, i.e., once the catalyst has become so spent that it becomes economically necessary to exchange the spent catalyst for fresh catalyst in the olefin polymerization reactor, the spent catalyst composition no longer has practical economic utility.

Since the cobalt oxide on carbon catalyst compositions are relatively expensive, it is desirable to find ways to get more useful catalytic life from the cobalt oxide on carbon catalysts. This invention provides one way of obtaining more useful catalytic life from spent cobalt oxide on carbon catalysts so that the relative cost per unit of catalyst composition is reduced substantially.

Briefly, we have made the discovery that when a spent cobalt oxide on carbon catalyst composition which had been used as a catalyst in olefin polymerization reactions is contacted with a dialkylacylamide having from 1 to about 6 carbon atoms in each alkyl group at a temperature of about 125° C. to about 200° C. for a time period of at least about 8 hours, upon separation of the solid cobalt oxide on carbon composition from the dialkylacylamide reagent, drying, and reactivating the cobalt oxide on carbon composition by heating it to the desired activation temperature, and this re-activated dialkylacylamide treated cobalt oxide on carbon catalyst composition is used again to dimerize or polymerize lower olefins to liquid olefin products, a large degree or percentage of the original catalytic activity is restored, in terms of unit weight of liquid product per unit weight of catalyst composition productivity. Optionally, the dialkylacylamide treated cobalt oxide on carbon composition may be treated with hydrogen peroxide to obtain a somewhat greater increase in regenerated catalyst activity than is obtained by the dialkylacylamide treatment alone. Thus, this invention provides a means for extending the useful life of cobalt oxide on carbon catalyst compositions and thereby lowering the unit cost of the catalyst composition.

This invention is applicable to the regeneration of any activated carbon supported cobalt oxide containing catalyst composition used in the polymerization of lower olefins to liquid olefin products. The cobalt oxide on the carbon may comprise essentially the only metal oxide on the carbon or it may be admixed or co-impregnated into the carbon with minor amounts, relative to the weight of the carbon, of other metal oxides such as iron oxide, chromium oxide, nickel oxide, zinc oxide, zirconium oxide, copper oxide, aluminum oxide, etc. Those catalysts are generally prepared by placing the carbon support in a solution, preferably aqueous, of a heat decomposable salt of the respective metals or of the metal oxide and allowing the absorbed carbon to take up the metal salt or metal oxide solution. The cobalt salt or metal salt or oxide impregnated carbon thus obtained is then dried, and activated by heating it to the desired activation temperature which may vary, depending upon the type of catalyst activity desired. For example, it has been found that for the dimerization of alpha-olefins, it is desirable to activate the cobalt oxide on carbon composition by heating it to from 200° C. to about 300° C. Higher activation temperatures may be used but are less preferred. However, when the cobalt oxide on carbon composition is to be used to catalyze the dimerization of low boiling liquid olefin feed mixtures containing substantial proportions of internal olefin isomers activations obtained by heating the compositions to temperatures above 300° C., preferably 360° to 550° C., and more preferably to about 450° C. to 475° C. are desired, to increase isomerization of the internal olefin isomers to alpha-olefins which will dimerize in the presence of cobalt oxide on carbon.

The discovery that the dialkylacylamides will regenerate the cobalt oxide on carbon catalysts is particularly surprising. The reason why these reagents accomplish this regeneration is not known. But the reason is not believed to be attributable to the solvent action of these materials because other solvents such as xylene and decalin, which are known to be better solvents than the dialkylacylamides for the material adhering to solid catalyst compositions give little or no improvement in catalytic activity when spent cobalt oxide on carbon catalysts are contacted with such solvents under the same conditions, and then re-activated in the usual manner.

Any dialkylacylamide which is liquid at ordinary temperatures may be used in the process of this invention but as a practical matter those having from 1 to about 6 carbon atoms in each alkyl group are the only ones used. Examples of these dialkylacylamides which may be used include dimethylformamide, diethylformamide, dipropylformamide, dimethylacetamide, diethylacetamide, dimethylpropionamide, dihexylformamide, etc. For reasons of cost, however, dimethylformamide is presently the preferred dialkylacylamide for use in this process.

In contacting the dialkylacylamide with the spent cobalt oxide on carbon catalyst, the dialkylacylamide is preferably kept quite hot, e.g., 140° to 180° C., or at refluxing temperatures but lower temperatures may be used with somewhat reduced effectiveness or with an extended contact time. Generally, temperatures above about 125° C. are used and may range up to about 200° C. or higher depending upon the selection of dialkylacylamide used and the contacting conditions used. One method of using the invention is to pump the hot liquid dialkylacylamide under pressure past and through the spent cobalt oxide on carbon catalyst, and recirculate the hot liquid as needed for the required amount of time. Another method of operating the process is to place the spent cobalt oxide on carbon catalyst on a perforated dish or tray and to pass the conensed vapors of the dialkylacylamide through the bed of spent catalyst for the desired period of time, the optimum time period being determined by those skilled in the art who will consider the choice of apparatus used, the degree of percent of reactivation desired, and the chemical and physical condition of the spent cobalt oxide on carbon catalyst which is being treated. Generally, however, we have found that contact time periods upwards of at least about 8 hours are required to effect any substantial degree of reactivation of the catalyst. The upper time limit is not critical but time periods over about 24 hours are not generally needed although they do not harm the catalyst.

We have found that a suitable type of contact treatment which may be used with efficiency is a Soxhlet type extraction technique, used commonly in extracting drugs from plant tissues. This method also offers the advantage of needing only limited volumes of the dialkylacylamide reagent. In this technique the spent cobalt oxide on carbon catalyst is placed in a perforated basket or thimble, as it is called in a Soxhlet apparatus, and a quantity of the dialkylacylamide is placed in a boiling vessel below the spent catalyst filled thimble. The dialkylacylamide is simply boiled and the vapors thereof pass upward and around the thimble into a cooling condenser, where the vapors are condensed. The vapors drop down into the thimble containing the catalyst. The dialkylacylamide solution containing materials which may have adhered to the catalyst, percolate through and down to the boiling pot, where the dialkylacylamide is again volatilized upward as before.

When the dialkylacylamide treatment of the cobalt oxide on carbon catalyst is completed, the catalyst is separated, dried, and re-activated by heating to the desired activation temperature as was done with the new catalyst.

When it is desired to treat the dialkylacylamide treated cobalt oxide on carbon composition with hydrogen peroxide, the solid composition is preferably at least partially dried, and then treated with hydrogen peroxide, e.g., as in an aqueous solution which may be of any desired concentration but which is usually, for efficiency sake, of at least 20% to 30% by weight concentration. The hydrogen peroxide is generally kept in contact with the cobalt oxide on carbon composition until any noticeable exothermic reaction begins to subside or for a period of at least about 1 hour although shorter time periods may be used. After the hydrogen peroxide treatment the solid composition is dried and reactivated as described above when the composition is to be used as a catalyst again.

We have found that it is sometimes advantageous to ammoniate the dried dialkylacylamide treated cobalt oxide on carbon composition prior to the activation heat treatment, especially when the re-activated catalyst is to be used in alpha-olefin dimerization processes. The drying step may be sufficient to remove substantially all or only part of any liquid or moisture before the ammoniation. In the ammoniation, the dried dialkylacylamide treated cobalt oxide on carbon is treated with ammonia gas, liquid ammonia, concentrated ammonium hydroxide, or more dilute ammonium hydroxide. For convenience, the dried material is merely added to a vessel containing a sufficient amount of concentrated ammonium hydroxide, and allow the treated composition to soak in the $NH_4OH$ and take up as much as it is able. Then, after drying the ammoniated composition, as before, the ammoniated cobalt oxide on carbon composition may be re-activated as was done with the new cobalt oxide on carbon composition.

We have found that one of the best catalysts that can be used for olefin dimerization is an ammoniated cobalt oxide on carbon composition. When activated by heating to from about 200° C. to about 300° C. these ammoniated cobalt oxide on carbon catalysts are especially suitable for dimerizing alpha-olefins, particularly gaseous alpha-olefins, to low boiling liquid olefin products containing major proportion of straight chained isomers. This is the subject matter of our copending applications, Serial No. 229,192, filed October 8, 1962, and Serial No. 294,750, filed July 12, 1963. The invention will be further described in the following detailed examples using dimethylformamide (DMF) as the dialkylacylamide reagent, although it is to be understood that other dialkylacylamides may be used.

To obtain meaningful comparative catalyst regeneration data the same spent catalyst was used as the standard "stock" spent catalyst in each regeneration although other spent cobalt oxide on carbon catalyst compositions may also be regenerated by the process of this invention. This catalyst was an ammoniated cobalt oxide on carbon composition. In each example the same re-activating heat treatments were applied to each composition. This involved heating the respective treated spent cobalt oxides on carbon compositions to 275° C. for 2 hours in flowing nitrogen flowing at 87 ml./min. at 35–50 mm. vacuum pressure.

*Example 1*

A standard spent catalyst was prepared as follows:

To 500 g. of a commercially available absorbent activated carbon (Pittsburgh Coke and Chemical Co.—type "BPL") there was added 850 ml. of concentrated ammonium hydroxide. The mixture was allowed to stand for three hours in a hood, and was then vacuum oven dried at 130° C. for 2 hours, and then air dried overnight. The weight of the resulting ammoniated carbon was 811 g. The composition was vacuum oven dried for 2 hours again, and then air dried again after which time the weight was 666.6 g. Four grams of this composition then was equivalent to 3 grams of the starting "BPL" carbon plus 1 gram of ammonium hydroxide solution.

To a solution of 87.3 g. of cobalt nitrate hexahydrate (equivalent to 22.5 g. of cobalt oxide) in 140 ml. of water there was added 150 g. of the above ammoniated carbon. The cobalt nitrate impregnated ammoniated carbon thus obtained was stirred on a hot plate until the impregnated carbon was outwardly dry, and then allowed to stand overnight in a hood. The next day it was heated on a hot plate to 120° C. and then vacuum oven dried for 7 hours.

The resulting dried composition was treated with 300 ml. of concentrated ammonium hydroxide and reheated on a hot plate for 1 hour. It was then vacuum oven dried overnight (15.75 hours). The composition then weighed 178.5 g.

A 50 g. portion of this ammoniated cobalt nitrate impregnated ammoniated carbon was activated by heating it in flowing nitrogen (87 ml./min. at 35 mm. vacuum pressure) to 275° C. and keeping it at that temperature for 2.33 hours.

A 21.7 g. portion of the above fresh ammoniated cobalt oxide on carbon catalyst was placed in a rocking type bomb reactor. The bomb reactor was then charged with about 1300 g. of propylene and the reactor was sealed. No liquid diluent was used. The bomb was placed in a rocker mechanism and rocked for 24 hours at room temperature. Upon opening the bomb after this time no gaseous propylene vented therefrom. The liquid product was poured off of the wet catalyst and weighed. The amount of liquid thus obtained was about 1300 grams which was equivalent to 60 g. of liquid product per gram of catalyst used.

A 3.0 g. portion of the resulting spent catalyst which had been used to polymerize propylene as described above was heated again in flowing nitrogen (87 ml./min. at 35 ml. vacuum pressure) to 275° C. for 2 hours. The weight of the re-activated catalyst thus obtained was 2.3 g.

This re-activated 2.3 g. of cobalt oxide on carbon catalyst, thus obtained, was placed in a bomb reactor again. Into the bomb reactor there was then placed 126 g. of propylene. The bomb was sealed and rocked as before for 24 hours at room temperature. Upon opening the bomb, 116.0 g. of unreacted propylene was vented, and only 8.8 g. of liquid product could be poured off of 2.8 g. of wet catalyst. The total liquid conversion yield was thus 9.3 g. (8.8 g.+0.5 g. the excess weight on the catalyst) for a 7.4% conversion and a productivity 4.04 grams of liquid product per gram of catalyst.

Thus, by merely re-heating the spent catalyst in nitrogen as before to activate it again there was obtained less than a 10% recovery of activity of the catalyst. This catalyst is used as the standard minimum regeneration catalyst against which the regenerated spent catalysts which are treated with various chemical agents as described below are compared.

*Example 2*

To 510 g. of "BPL" activated carbon there was added 800 ml. of concentrated ammonium hydroxide. The mixture was air dried in a hood for 2 hours and then vacuum oven dried for three days.

A 153.5 g. portion of this ammoniated carbon was added to a solution of 89.3 g. of cobalt nitrate hexahydrate (equivalent to 23.0 g. of cobalt oxide) in 165 ml. of water. The cobalt nitrate impregnated ammoniated carbon thus obtained was air dried for 5.5 hours and vacuum oven dried overnight. The dried composition thus obtained was treated with 270 ml. of concentrated ammonium hydroxide and air dried and vacuum oven dried again. The composition then weighed 184 g.

Three 50 g. portions of the resulting ammoniated cobalt nitrate impregnated carbon composition were then activated by heating them for about 2–2.5 hours in flowing nitrogen in the manner described in Example 1. Five portions of the activated ammoniated cobalt oxide on carbon compositions thus obtained (wt. ranged from 22.5 to 29.9 g.) were used to polymerize propylene in 5 rocking type bomb reactors in the manner described in Example 1. The productivity of liquid product per gram of catalyst for the five runs were 35.6, 42.8, 41.3, 38.6, 44.0 grams of liquid product per gram of catalyst used. The average productivity was 40.2 g. of liquid product per gram of catalyst.

The wet spent catalysts from each of the above 5 polymerization runs were combined. The total weight was 152.0 g.

A 14 g. portion of this undried spent catalyst material was placed in the thimble of a standard Soxhlet type extraction apparatus. Dimethylformamide was placed in the bottom of the apparatus and refluxed through the spent catalyst overnight (16 hours) and then the extracted catalyst was dried to a weight of 13.1 g.

A 2.8 g. portion of this dimethylformamide treated spent catalyst was then re-activated by heating it in flowing nitrogen to 275° C. for 2 hours as described in Example 1. The weight of the activated catalyst, thus obtained was then 2.2 g.

The 2.2 g. of re-activated dimethylformamide regenerated catalyst composition, thus obtained, was combined with 95 g. of propylene and 10 ml. of heptane in a bomb reactor. The bomb was sealed and placed in a rocking mechanism and rocked for 24 hours at room temperature. After this time, the bomb was vented of 23.0 g. of unreacted propylene, and 74.5 g. of liquid was poured off of 3.6 g. of wet catalyst. After subtracting the weight of the heptane diluent from the total liquid weight (74.5 g.+1.4 g.) there was obtained 69.1 g. of liquid propylene polymer for a conversion of 72.8% and a productivity of 31.4 g. of liquid product per gram of catalyst used. This is equivalent to 78.2% of the original conversion of the fresh catalyst.

*Example 3*

A 3 gram portion of the combined spent ammoniated cobalt oxide on carbon catalyst, obtained as described in Example 2, was placed in another standard Soxhlet extraction apparatus and extracted with refluxing decalin (decahydronaphthalene) for 16.5 hours. The catalyst was then vacuum oven dried and activated by heating the decalin extracted spent ammoniated cobalt oxide on carbon catalyst in flowing nitrogen at 275° C. for 2 hours as described in Example 1. The re-activated catalyst, thus obtained, weighed 2.3 g.

The 2.3 g. of re-activated decalin-extracted cobalt oxide on carbon composition, thus obtained, 90 g. of propylene, and 6.8 g. of heptane were charged to a rocking type bomb reactor, and rocked as described in Example 1. When opened, 70 g. of unreacted propylene vented from the bomb and then only 14.7 g. of liquid was poured off 3.1 g. of wet catalyst. After subtracting the weight of the heptane from the total liquid weight (14.7 g.+0.8 g.) there was obtained only 8.7 g. of liquid propylene polymer. Thus the conversion was only 9.7% and the productivity was only 3.8 g. of liquid product per gram of catalyst used. This is 9.5% of original conversion by the fresh catalyst and is less than the standard non-chemically treated catalyst of Example 1. It is thus apparent that decalin does not aid in regenerating the catalyst as does dimethylformamide.

*Example 4*

Another 3.2 g. of the combined spent catalysts, prepared as described in Example 2, was extracted overnight in decalin in a Soxhlet extractor, vacuum oven dried, and then extracted with dimethylformamide for 24 hours as described in Example 2. The catalyst was vacuum oven dried (130° C.) and activated as described in Example 1. The final weight was 2.5 g.

This 2.5 g. portion of decalin and dimethylformamide extracted and re-activated catalyst was combined with 10 ml. of heptane and 118 g. of propylene in a rocking bomb reactor for 24 hours at room temperature as described in Example 1. Upon opening the bomb, 43.0 g. of unreacted propylene vented from the vessel, and 75.6 g. of liquid was poured off 3.5 g. of wet catalyst. After subtracting the weight of the heptane diluent from the total liquid weight (75.6 g.+1.0 g.) the liquid propylene polymerization product amounted to 69.8 g. for a 59.2% conversion and a productivity of 28.0 g. of liquid product per gram of catalyst, which is 69.4% of the original conversion.

*Example 5*

Another 3.0 g. portion of the combined spent ammoniated cobalt oxide on carbon catalyst, obtained as described in Example 2, was extracted with refluxing xylene for 24 hours, in a Soxhlet extractor in the same manner described in Example 2, and then vacuum dried and activated in the same manner to 275° C. for 2 hours. The final weight of the activated xylene extracted spent ammoniated cobalt oxide on carbon catalyst was 2.4 g.

This 2.4 g. of activated xylene extracted catalyst was combined with 10 ml. of heptane (6.8 g.), and 110 g. of propylene, and after sealing the bomb, the bomb and its contents were rocked for 24 hours at room temperature for 24 hours. Upon opening the bomb, 102.0 g. of unreacted propylene vented from the bomb, and 13.0 g. of liquid was poured off 3.5 g. of wet catalyst. After deducting the weight of the heptane from the total product weight (13.0 g.+1.1 g.) the liquid product weighed 7.3 g. for a 6.6% conversion and productivity of only 3.04 g. of liquid product per gram of catalyst which is only 7.5% of the conversion of the fresh ammoniated cobalt oxide on carbon catalyst.

*Example 6*

Another 3.2 g. portion of the combined spent ammoniated cobalt oxide on carbon catalyst, obtained as described in Example 2, was extracted with xylene for 19 hours in a Soxhlet extractor, vacuum oven dried, and then extracted for 24 hours with dimethylformamide in a similar Soxhlet extraction apparatus. After drying, and activating as described in Example 1, the final weight of the catalyst was 2.5 grams.

The 2.5 g. of re-activated xylene and dimethylformamide extracted spent catalyst described above, was combined with 6.8 g. of heptane, and 112 g. of propylene in a bomb reactor. The contents were rocked for 24 hours at room temperature as described in Example 2. Upon opening, 33 g. of unreacted propylene was vented, and then 81.2 g. of liquid product was poured off 3.1 g. of wet catalyst. The weight of the heptane was subtracted from the total liquid weight (81.2 g.+0.6 g.) to obtain 75.0 g. of liquid product for a conversion of 67.0% and a productivity of 3.0 g. of liquid product per gram of catalyst which is 74.3% of the average fresh ammoniated cobalt oxide on carbon productivity of Example 2.

Example 7

A 6.0 g. portion of the combined spent ammoniated cobalt oxide on carbon catalyst, obtained as described in Example 2, was extracted with dimethylformamide for 20.25 hours as described in Example 2, and vacuum oven dried.

A 2.7 g. portion of the dried dimethyl formamide extracted spent catalyst obtained above, was treated with 10 ml. of 30% hydrogen peroxide. There was an immediate exothermic reaction. The mixture was allowed to stand at room temperature in a hood for about 65 hours and then activated by heating in flowing nitrogen for two hours as described in Example 2. The final weight of the reactivated catalyst was 2.5 g.

The 2.5 g. portion of re-activated catalyst obtained above, was combined with 6.8 g. of heptane and 123 g. of propylene in a bomb reactor and after sealing the bomb, the contents thereof were shaken on a rocker for 24 hours at room temperature. Upon opening the bomb 28.0 g. of unreacted propylene was vented and 95.2 g. of liquid was poured off of 3.6 g. of wet catalyst. From the total liquid weight (95.2 g.+1.1 g.) the weight of heptane was subtracted to obtain 89.5 g. of liquid product for a conversion of 72.8% and a productivity of 35.8 g. of liquid product per gram of catalyst which is 88.7% of the average productivity of the fresh ammoniated cobalt oxide on carbon catalyst.

Example 8

A 3.0 g. portion of the combined spent ammoniated cobalt oxide on carbon catalysts, obtained as described in Example 2, was treated with 10 ml. of 30% hydrogen peroxide. A slow starting strong exothermic reaction was noted. The mixture was allowed to stand in a hood for about 65 hours and then activated by heating to 275° C. in flowing nitrogen in the manner described in the preceding examples. The final weight of the catalyst was 2.4 g.

This 2.4 g. portion of re-activated hydrogen peroxide treated spent ammoniated cobalt oxide on carbon catalyst, thus obtained, was combined with 6.8 ml. of heptane and 123 g. of propylene in a bomb and as in the prior examples, shaken on a rocker for 24 hours. Upon opening, 109.0 g. of unreacted propylene was vented and 19.3 g. of liquid was poured off of 3.1 g. of the wet catalyst. The weight of the heptane (6.8 g.) was substracted from the total liquid weight 20.0 g. (19.3 g.+0.7 g.) to obtain only 13.2 g. of liquid product for a conversion of 10.7% and a productivity of only 5.5 g. of liquid product per gram of catalyst which is only 13.6% of the average activity of the fresh ammoniated cobalt oxide on carbon catalyst. This chemical regeneration treatment with hydrogen peroxide is just a little better than the standard heat treatment of Example 1.

Example 9

This example illustrates the regeneration process of the invention used repeatedly on the same spent catalyst.

A 14 g. portion of the undried combined spent ammoniated cobalt oxide on carbon catalyst, obtained as described in Example 2, was extracted with dimethylformamide for about 16 hours and then vacuum oven dried for 1 hour. The weight of this partially dried DMF treated catalyst was 13.1 g.

A 2.8 g. portion of this partially dried DMF-extracted catalyst was activated at 275° C. for 2 hours as described in the preceding examples. The final weight was 2.2 g.

The remainder of the partially dried DMF extracted combined spent catalyst, 10.3 g., was divided into two portions of 7.3 g. and 3.0 g.

The 7.3 g. portion was extracted in a Soxhlet apparatus with refluxing water for 21 hours and vacuum oven dried for 2 hours (wt. 6.3 g.).

A 3.0 g. portion of this water extracted portion was activated by heating to 275° C. for 2 hours in flowing nitrogen as described in the preceding examples. The final weight was 2.8 g.

The 3.0 g. gram portion of the DMF extracted combined spent ammoniated cobalt oxide on carbon catalyst was impregnated with 5 ml. of concentrated ammonium hydroxide (excess liquid), and air dried in a hood for 1.5 hours and then vacuum oven dried for 2.25 hours. Then 5 ml. more of concentrated ammonium hydroxide was added, and the mixture was re-dried, and activated to 275° C. for 2 hours as described in the preceding examples. The final weight of the catalyst was 2.4 g.

These three regenerated catalysts 2.2 g., 2.8 g., and 2.4 g. respectively, were used again to polymerize propylene in a bomb reactor for 24 hours at room temperature. The productivities were 31.4, 21.7, and 24.4 g. of liquid product per gram of catalyst, respectively. The average productivity for the three regenerated catalysts was 25.7 g. of liquid product per gram of catalyst.

The three spent catalysts from the above runs were combined (total weight 8.1 g.) and again extracted with DMF for 17 hours, vacuum oven dried, and activated in flowing nitrogen to 275° C. for 2 hours as in the preceding examples. The re-activated catalyst was divided into three portions two of which, 2.7 g., and 2.8 g. were used to polymerize propylene in bomb reactors, rocked for 24 hours at room temperature (25° C.).

The 2.7 g. portion of twice regenerated reactivated catalyst was combined with 6.8 g. of heptane and 113 g. of propylene. Upon venting the reactor after the reaction time 66.0 g. of propylene was vented, 51.1 g. of liquid was poured off of 4.3 g. of wet catalyst. The weight of heptane (6.8 g.) was subtracted from the total liquid weight (51.1 g.+1.6 g.) to obtain the weight of liquid product, 45.9 g., which was a 40.6% conversion and a 17.0 g. of liquid product per gram of catalyst productivity, which is 42% of the average productivity of the fresh ammoniated cobalt oxide on carbon catalyst and 68% of the productivity of the catalyst after the first regeneration.

The 2.8 g. portion of twice DMF regenerated, and re-ammoniated, catalyst was combined with 6.8 g. of heptane, and 100 g. of propylene in the autoclave reactor. After 24 hours at room temperature in the rocker, 50.0 g. of unreacted propylene was vented and 55.6 g. of liquid was poured off the 4.0 g. of wet catalyst. The heptane weight (6.8 g.) was subtracted from the total liquid weight (55.6 g.+1.2 g.) to obtain 50.0 g. of liquid product, which was a 50.0% conversion, and a 17.9 g. of liquid product per gram of catalyst productivity. This productivity was 44.3% of the average productivity of the fresh ammoniated cobalt oxide on carbon catalyst and was 71.6% of the productivity of the same catalyst after the first regeneration.

We claim:

1. A process for the regeneration of spent cobalt oxide on carbon polymerization catalysts which comprises contacting a cobalt oxide on carbon catalyst composition which has become spent from use in the polymerization of olefins, with a dialkylacylamide having from 1 to about 6 carbon atoms in each alkyl group at a temperature of from about 125° C. to about 200° C. for a time period of at least about 8 hours, drying the dialkylacylamide treated catalyst composition.

2. A process as described in claim 1 wherein the dried dialkylacylamide treated catalyst composition is reactivated by heating it to activation temperatures.

3. A process as described in claim 1 wherein the dialkylacylamide is dimethylformamide.

4. A process as described in claim 1 wherein the spent cobalt oxide on carbon catalyst composition is a spent ammoniated cobalt oxide on carbon catalyst composition.

5. A process for the regeneration of spent cobalt oxide on carbon polymerization catalyst compositions which comprises contacting a cobalt oxide on carbon catalyst composition which has become spent from use in the polymerization of olefins, with dimethylformamide at a temperature of from about 140°–160° C. for at least about 16 hours, drying the dimethylformamide treated spent catalyst composition, and activating the dried catalyst composition by heating it to a temperature of from about 200° C. to about 550° C.

6. A process as described an claim 2 wherein the dried dialkylacylamide treated spent cobalt oxide on carbon catalyst composition is ammoniated prior to the reactivation step.

7. A process as described in claim 5 wherein the dried dimethylformamide treated cobalt oxide on carbon catalyst composition is ammoniated prior to the activation heat treatment of the composition.

8. A process as described in claim 1 wherein the dialkylacylamide treated catalyst composition is treated with hydrogen peroxide.

9. A process as described in claim 5 wherein the dried dimethylformamide treated spent catalyst composition is treated with aqueous hydrogen peroxide prior to being activated by heating it to a temperature of from about 200° C. to about 550° C.

References Cited by the Examiner

UNITED STATES PATENTS

| | | | |
|---|---|---|---|
| 1,678,626 | 7/1928 | Jaeger | 252—412 |
| 2,332,276 | 10/1943 | Stahly | 260—683.15 |
| 2,502,030 | 3/1950 | Scheiderbauer | 260—32.6 |
| 2,717,888 | 9/1955 | Feller et al. | 252—447 |
| 2,742,409 | 4/1956 | Dawson | 252—414 |

OSCAR R. VERTIZ, *Primary Examiner.*

MAURICE A. BRINDISI, *Examiner.*

R. DAVIDSON, A. H. GRIEF, *Assistant Examiners.*